United States Patent
Morinaga (10) Patent No.: US 6,808,273 B2
(45) Date of Patent: Oct. 26, 2004

(54) PROJECTOR (75) Inventor: Kenichi Morinaga, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 10/665,561

(22) Filed: Sep. 22, 2003

(65) Prior Publication Data
US 2004/0080719 A1 Apr. 29, 2004

(30) Foreign Application Priority Data

Sep. 19, 2002 (JP) .................................. 2002-005939 U (51) Int. Cl.[7] .............................................. G03B 21/14
(52) U.S. Cl. ...................................................... 353/119
(58) Field of Search ............................. 353/57, 60, 61, 353/100, 101, 119

(56) References Cited

U.S. PATENT DOCUMENTS 5,287,132 A * 2/1994 Suzuki et al. ............... 353/119
5,347,324 A * 9/1994 Sasaki et al. ............... 348/789
6,190,015 B1 * 2/2001 Tsai et al. ................... 353/101
6,238,050 B1 * 5/2001 Konuma et al. ............. 353/57

FOREIGN PATENT DOCUMENTS

| JP | 10-090811 | 4/1998 |
| JP | 2000-162703 | 6/2000 |
| JP | 2001-242542 | 9/2001 |
| JP | 2001-249402 | 9/2001 |
| JP | 2001-272648 | 10/2001 |

* cited by examiner

Primary Examiner—William C. Dowling
(74) Attorney, Agent, or Firm—Crowell & Moring LLP (57) ABSTRACT A lens cover is provided for being held between the air outlet and the projection lens. This allows the lens cover to prevent hot air exhausted from the air outlet from running across the light path of a projected light from the projection lens when the projection of an image is desired, hence avoiding the generation of shimmers in the projected image. Preferably, the lens cover is arranged vertical to the optical axis of the projection lens for turning movement on an axis located between the projection lens and the air outlet. Accordingly, the lens cover is hardly lost.

13 Claims, 10 Drawing Sheets

PROJECTOR

BACKGROUND OF THE INVENTION

The present invention relates to a projector and more particularly to a projector having a cooling mechanism to cool a light source provided in a housing.

A projector is designed for generating an optical image from image data provided by a personal computer or a video camera and projecting it on a screen for display.

Such a projector is disclosed in Japanese Patent Laid-open Publication No. Hei 10-90811 which has an air exhaust opening provided next to projection lens in the front side of a housing for exhausting hot air which was used for cooling by an exhaust fan, hence minimizing the effect of hot exhaust air and noise from the exhaust fan and the effect of unwanted light leaked from a light source which may annoy viewers. This projector is referred to as a first prior art hereinafter.

Another prior art may be featured with a closable lens cover for closing and protecting the front side of the projection lens. For example, some projectors of a type where a lens window for a projection lens is openably closed with a slidable lens cover are disclosed in Japanese Patent Laid-open Publication No.2000-162703, 2001-272648, and 2001-249402. These projectors are referred to as a second prior art hereinafter.

Also, a liquid crystal projector which has a shutter mechanism for protecting the front side of a projection lens is disclosed in Japanese Patent Laid-open Publication No.2001-242542. This liquid crystal projector is referred to as a third prior art hereinafter.

However, the first prior art has the air exhaust opening for exhausting hot air provided next to the projection lens in the front side of its housing, hence permitting the hot air from the air exhaust opening to run across the optical path of projected light from the projection lens and generate undesired shimmers (heat wave) in the optical image projected on the screen.

Figure 13:
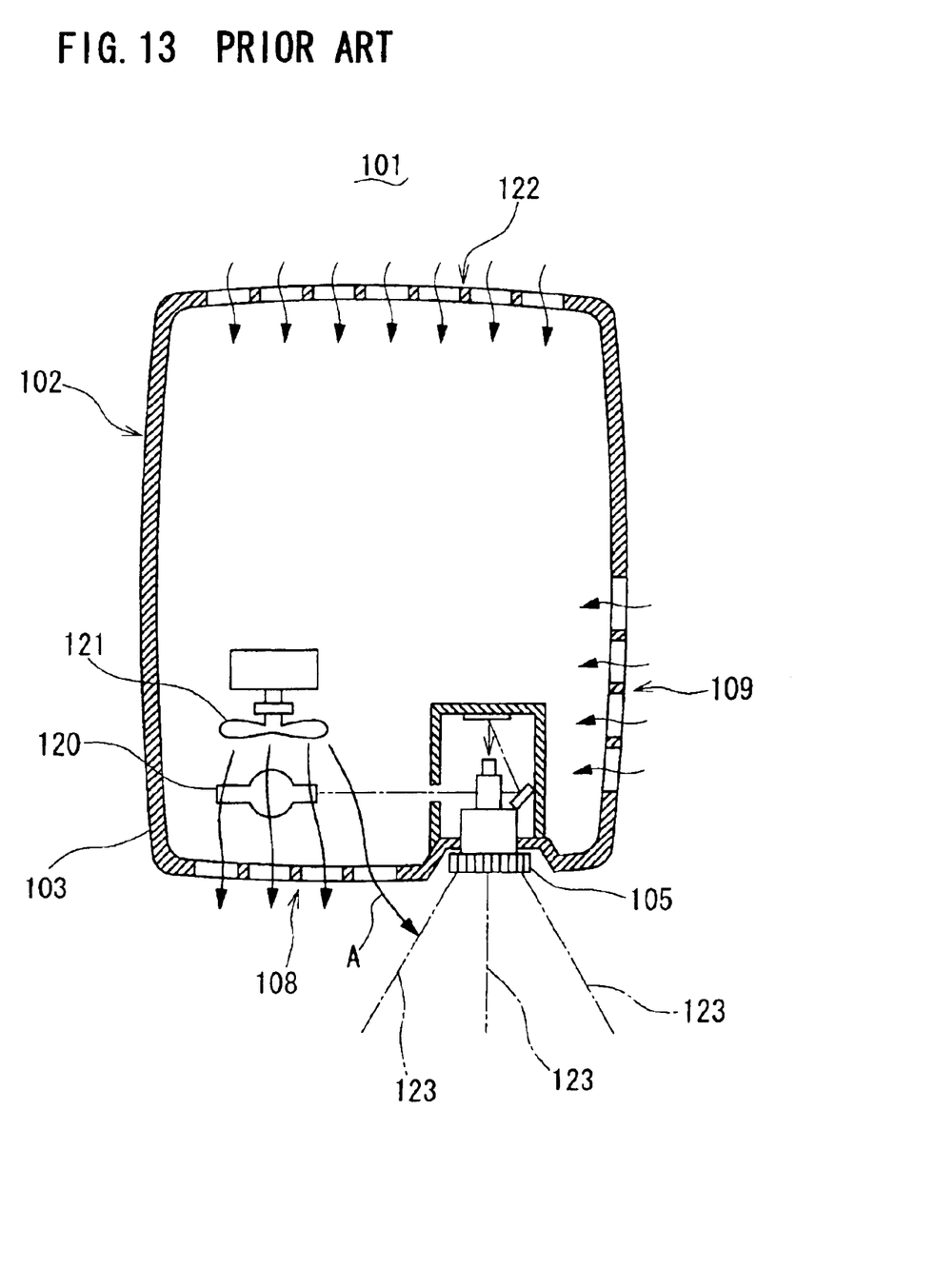
FIG. 13 is an explanatory view of a mechanism of the generation of shimmers in a conventional projector.
Figure 14:
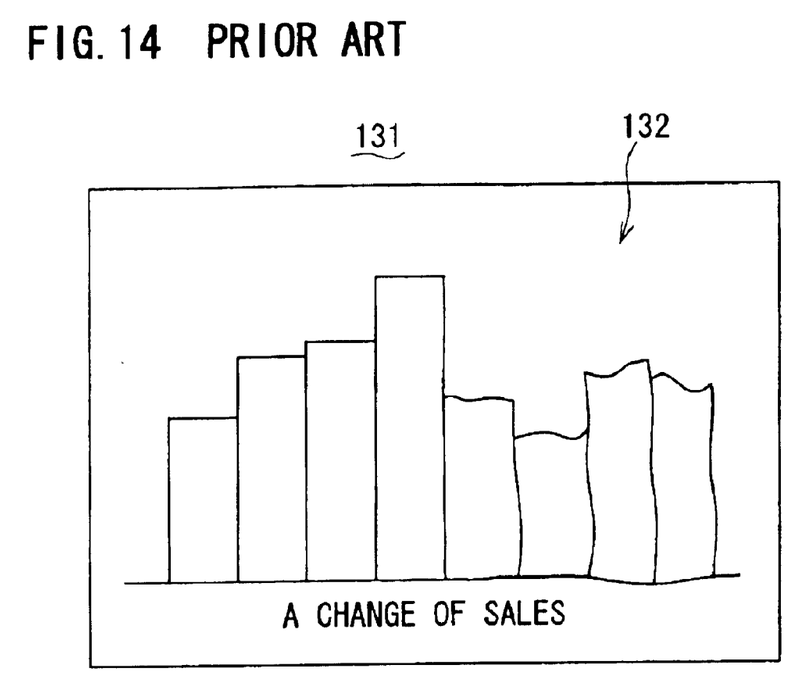
FIG. 14 is a view showing shimmers in the projected image caused by the conventional projector.

The generation of shimmers in the optical image will now be explained in detail referring to FIGS. 13 and 14. As shown in FIG. 13 the air for cooling is introduced into the interior of a main body 102 from two air inlets 109 and 122 provided in the right side and the rear side of a housing 103 respectively and directed towards a lamp 120 by the action of an exhaust fan 121. Hot air which was used for cooling the lamp 120 is exhausted from an air outlet 108 provided in the front side of the housing 103. The hot air indicated by arrow A may flow across the optical path of a projected light 123 released from a projection lens 105. As the projected light 123 is interrupted particularly at an area adjacent to the air output 108 by the hot air from the air outlet 108, its image on a screen 131 may fluctuate significantly at the right 132 as shown in FIG. 14.

The second and third prior arts also fail to eliminate the above drawback.

SUMMARY OF THE INVENTION

It is hence an object of the present invention to provide a projector which can prevent hot air exhausted from the air outlet from running across the light path of the light projected with the projection lens can eliminate the generation of shimmers in the projected image.

A projector in accordance with an aspect of the present invention comprises a projection lens, an air outlet and a lens cover.

The projection lens projects an optical image using a light emitted by a light source.

The air outlet is for exhausting hot air which was used for cooling the light source to the outside.

The lens cover protects the projection lens.

The lens cover can be held between the air outlet and the projection lens.

The foregoing arrangement allows the lens cover to be turned open and held between the air outlet and the projection lens when the projection of an image is desired. Thus, the lens cover can prevent hot air exhausted from the air outlet from running across the light path of the light projected with the projection lens and can eliminate the generation of shimmers in the projected image.

DETAILED DESCRIPTION OF THE PREFERRED EMBODIMENT

Figure 1:
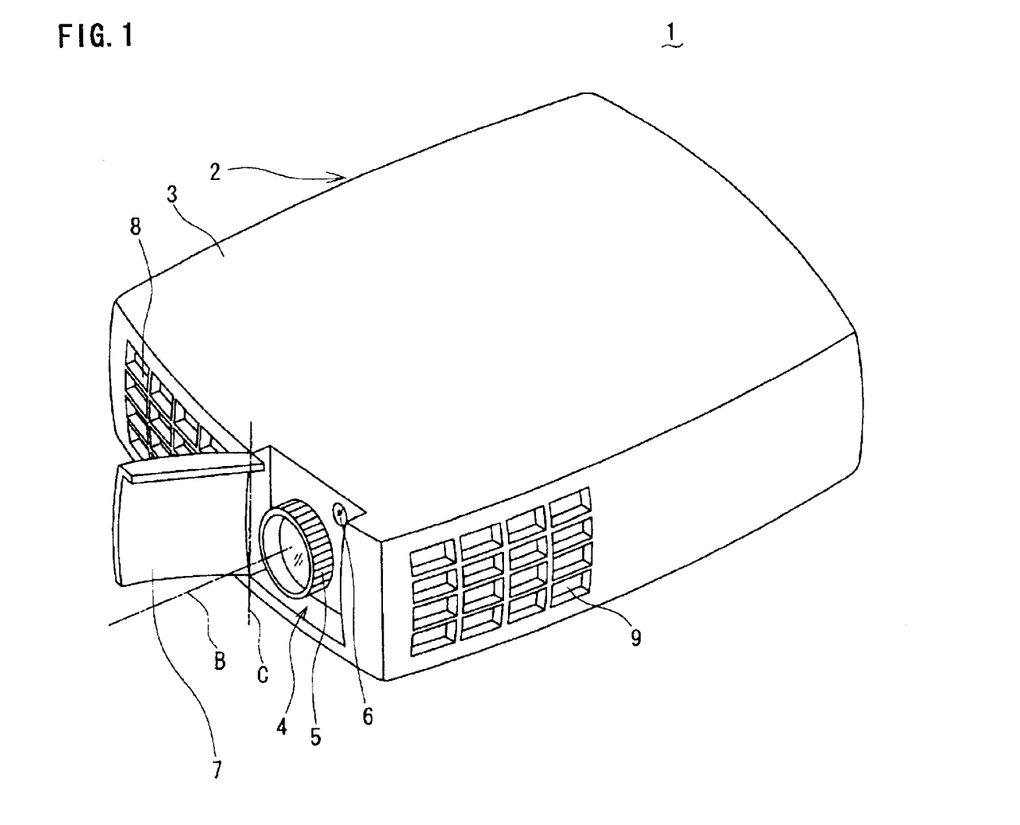
FIG. 1 is a perspective view of a projection showing a first embodiment of the present invention.

Some embodiments of the present invention will be described referring to the relevant drawings. FIG. 1 is an external view of a projector according to the first embodiment. The projector denoted by 1 is designed for generating an optical image using image data input by a personal computer or a video camera and projecting it on a screen. The projector 1 has a recess 4 provided in the front side of a housing 3 of a main body 2. The recess 4 hauses a projection lens 5 to project an image and a signal detector 6 for receiving radio signals from a remote-control device not shown. At the left of the recess 4, the projector 1 has a lens cover 7 for protecting the projection lens 5 and an air output 8 for exhausting an exhaust air which was used for cooling a lamp in the main body 2 to the outside of the main body 2. The lens cover 7 is arranged vertical to the optical axis B of the projection lens 5 for turning open and close on the axis C located between the projection lens 5 and the air outlet 8 in the front side of the housing 3. The projector 1 has an air inlet 9 for taking the air to cool the lamp in the main body 2 in the right side of the housing 3 of the main body 2.

Figure 2:
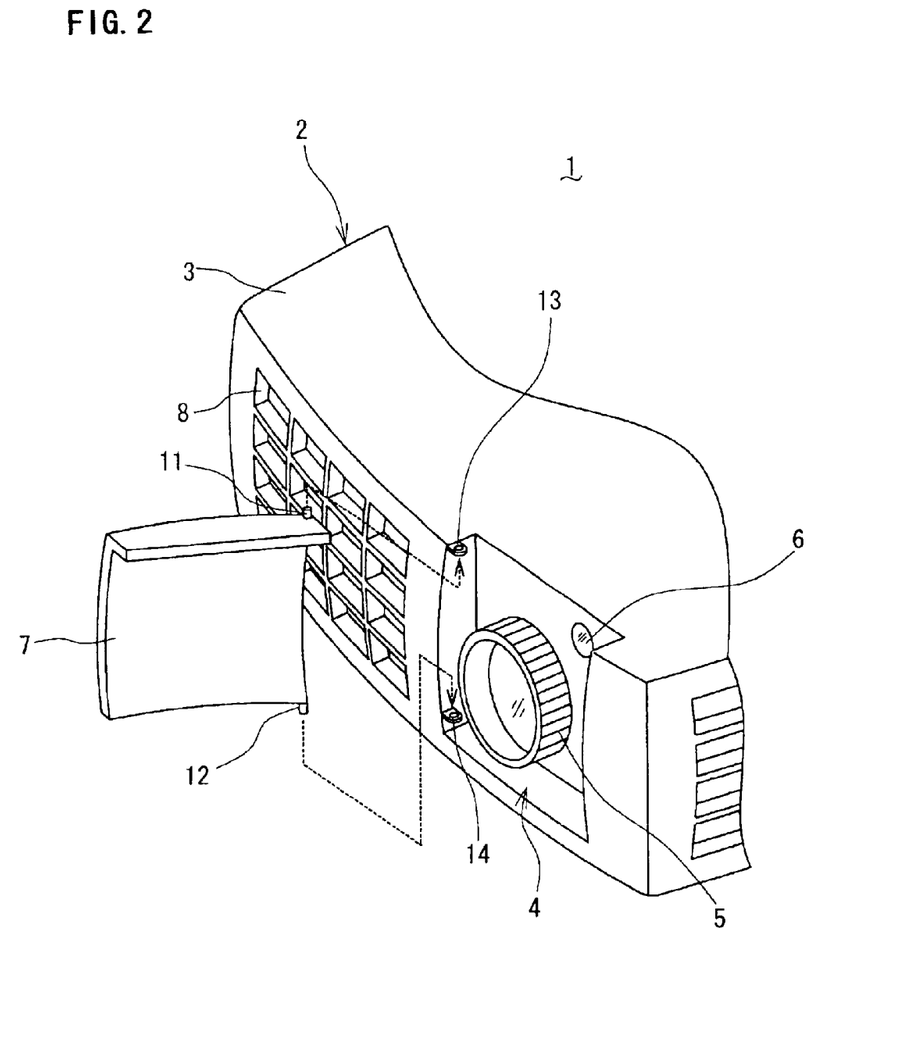
FIG. 2 is a perspective view of a portion near a lens cover of the projector.

The way to attach the lens cover 7 to the housing 3 will be explained referring to FIG. 2. The lens cover 7 has a pair of pins 11 and 12 to connect the lens cover 7 to the housing 3 provided at the upper and lower ends. The housing 3 has a pair of holes 13 and 14 to attach the lens cover 7 in the recess 4. After the pin 11 of the lens cover 7 is inserted into the hole 13, the lens cover 7 is lifted up by pressing and its pin 12 is inserted into the other hole 14, so that lens cover 7 can hinge. The axis of hinging movement of the lens cover 7 constructed by the pins 11 and 12 is the axis C shown in FIG. 1. Although not explicitly shown in the drawings, the pins 11 and 12 of the lens cover 7 and their corresponding holes 13 and 14 provided in the housing 3 are shaped so as to hold the lens cover 7 at a desired angle. For example, the pins 11 and 12 are shaped of a polygonal form such as a pentagon, and the holes 13 and 14 are shaped to accept their corresponding pins. With the pins 11 and 12 and their corresponding holes 13 and 14 shaped of such a particular form, the lens cover 7 can securely be held at a desired angle by the user during the projection of an image through the projection lens 5.

Figure 3:
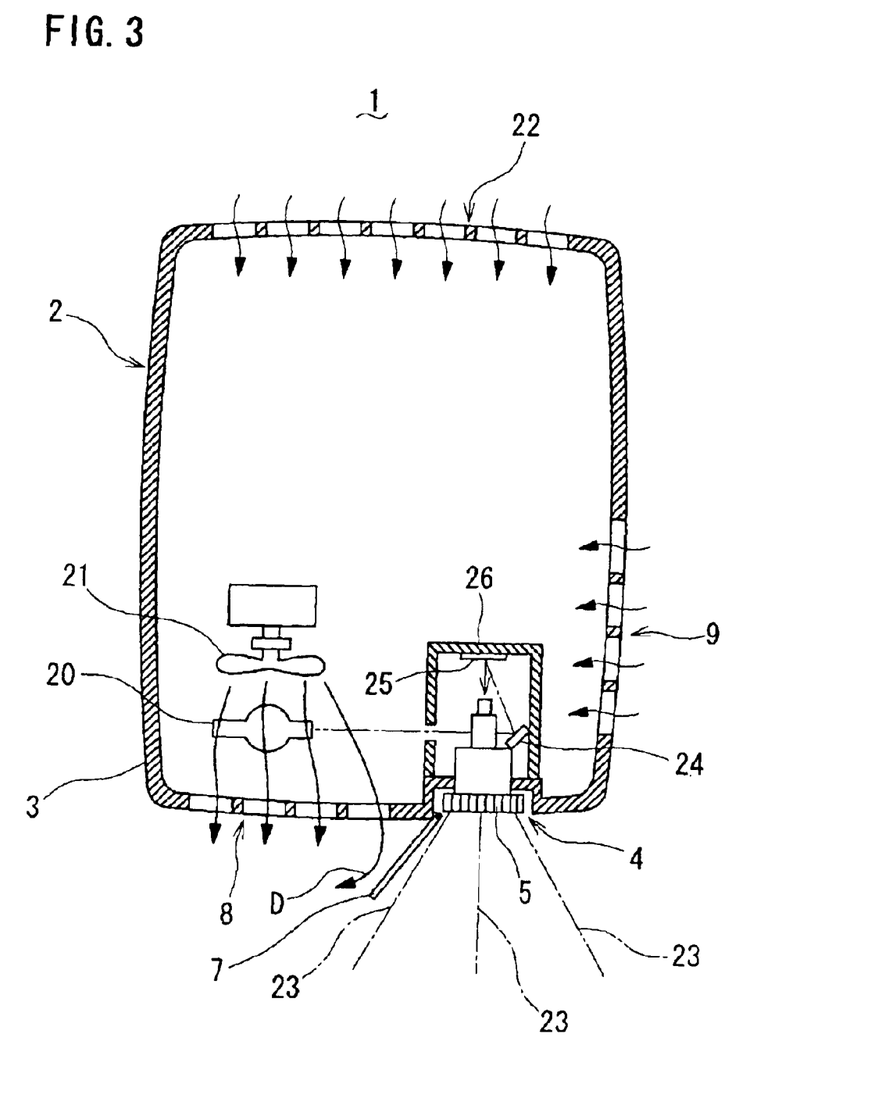
FIG. 3 is an explanatory view of a scheme in the projector for preventing the generation of shimmers in the projected image.

The internal arrangement of the projector 1 will now be described referring to FIG. 3. The housing 3 of the main body 2 contains a lamp 20 as a light source of a projected light 23 through the projection lens 5, an exhaust fan 21 for cooling the lamp 20, and a casting engine 26 for generating and projecting an optical image using a light from the lamp 20. The housing 3 of the main body 2 also has an air inlet 22 provided in the rear side thereof for taking the air to cool the lamp 20 in the main body 2.

The casting engine 26 will be explained in more detail. The casting engine 26 includes a reflecting mirror 24, a DMD (digital micro-mirror device) 25, and the projection lens 5. The light emitted from the lamp 20 is received via a color wheel by the casting engine 26, where the light is directed from the reflecting mirror 24 via a relay lens not shown to the DMD 25. The DMD 25 reflects the incident light to generate an optical image, which is then sent to the projection lens 5. The light from the DMD 25 is made into the projected light 23 projected onto a screen by the projection lens 5.

A scheme applied to the projector 1 for preventing the generation of shimmers in the projected image will be explained. The air taken from the two air inlets 9 and 22 at the right and rear sides of the housing 3 is driven by the action of the exhaust fan 21 towards the lamp 20 for cooling before exhausted as hot air from the air outlet 8. When the hot air which was used for cooling the lamp 20 is exhausted from the air outlet 8, a portion of the hot air may flow across the light path of the projected light 23 from the projection lens 5. This causes the projected light 23 to be interrupted particularly in the area adjacent to the air outlet 8 by the hot air, hence generating shimmers in the projection image on the screen. However, the projector 1 of this embodiment has the lens cover 7 provided for turning movement on the axis C as shown in FIG. 1. In action, the lens cover 7 can be turned on the axis C and held at a desired angle by the user during the projection of the image through the projection lens 5. Accordingly, the hot air exhausted from the air outlet 8 is deflected from an area adjacent to the projection lens 5 as denoted by the arrow D and thus prevented from running into the light path of the projected light 23 from the projection lens 5. As the result, the generation of shimmers in the projected image can successfully be avoided.

As described above, the projector 1 of the first embodiment has the lens cover 7 arranged vertical to the optical axis of the projection lens 5 for turning movement on the axis located between the projection lens 5 and the air outlet 8 at the front side of the housing 3. In the projection of an optical image through the projection lens 5, the lens cover 7 is turned open on the axis and held at such an angle that the hot air exhausted from the air outlet 8 is prevented from running across the light path of the projected light 23 from the projection lens 5. Accordingly, the generation of shimmers in the projected image can be avoided with no use of a dedicated air-flow guide for blocking the hot air, thus ensuring a quality of the projected image. Also, since the lens cover 7 in the projector 1 of the first embodiment is hinged for opening and closing actions, it can hardly be lost.

Figure 4:
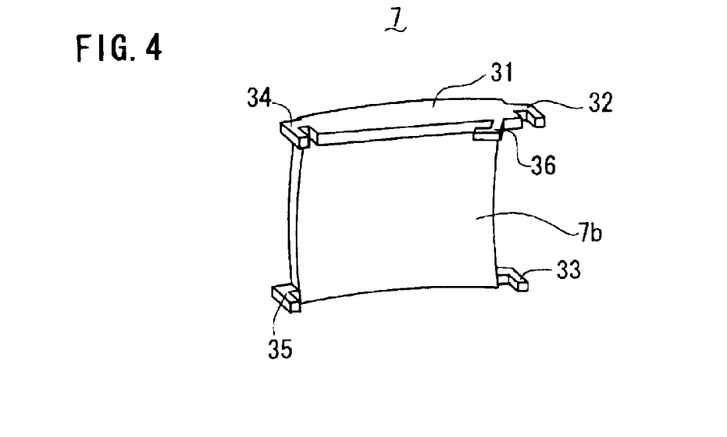
FIG. 4 is a perspective view of a lens cover in a projector showing a second embodiment of the present invention.
Figure 5:
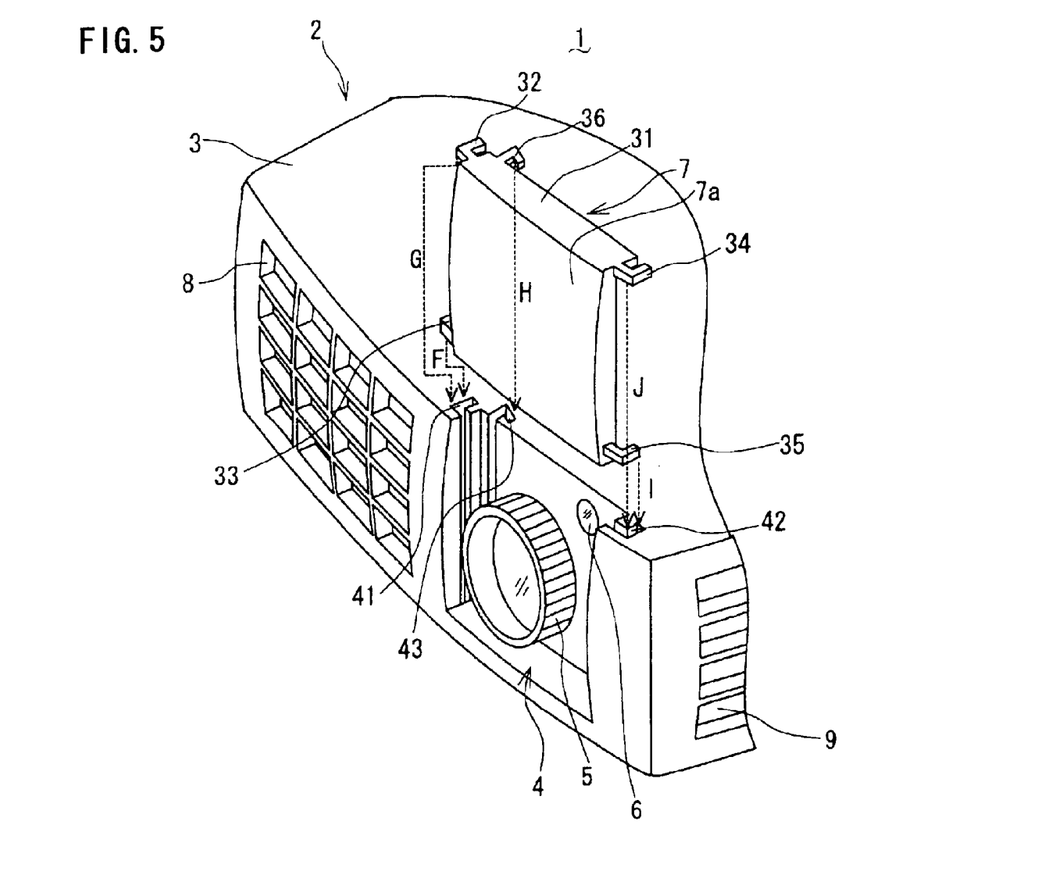
FIG. 5 is an explanatory view of the way to attach the lens cover to the housing of the projector when the projection of an image is not desired.
Figure 6:
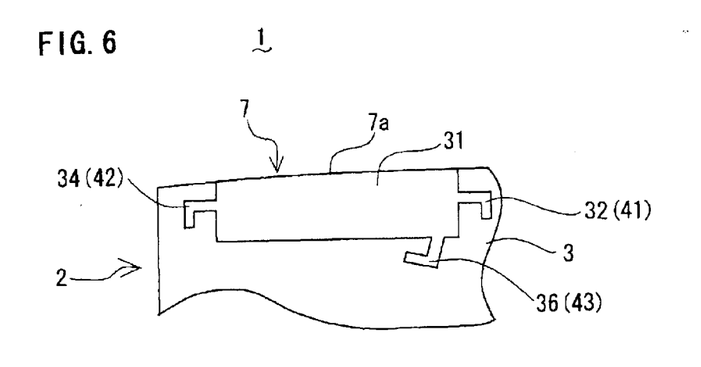
FIG. 6 is an upper view of a portion near the lens cover attached to the housing and shutting up the projection lens in the projector.
Figure 7:
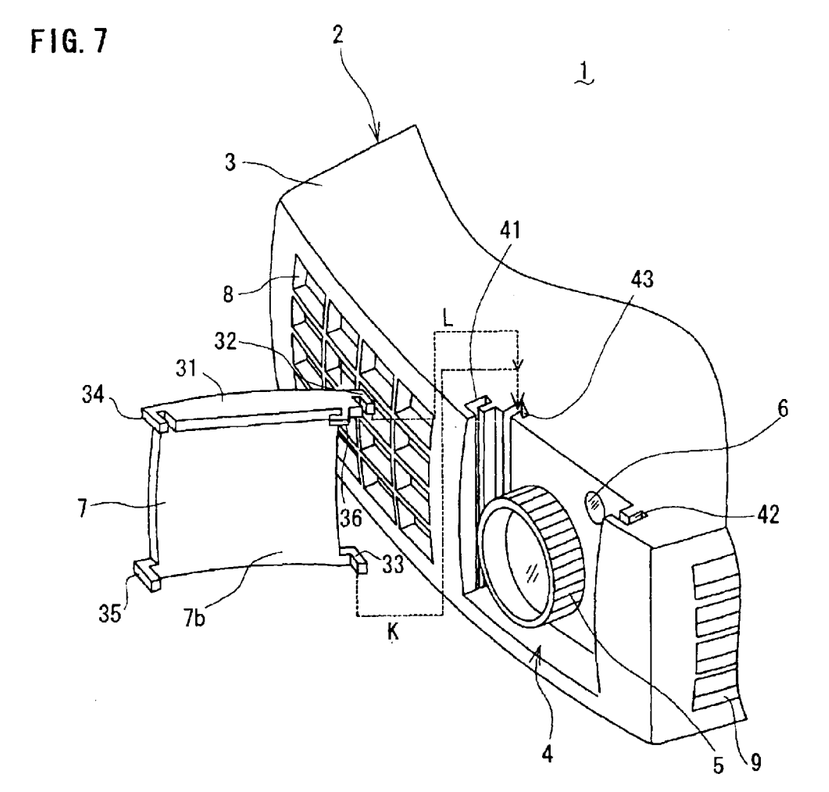
FIG. 7 is an explanatory view of the way to attach the lens cover to the housing in the projector when the projection of an image is desired.
Figure 8:
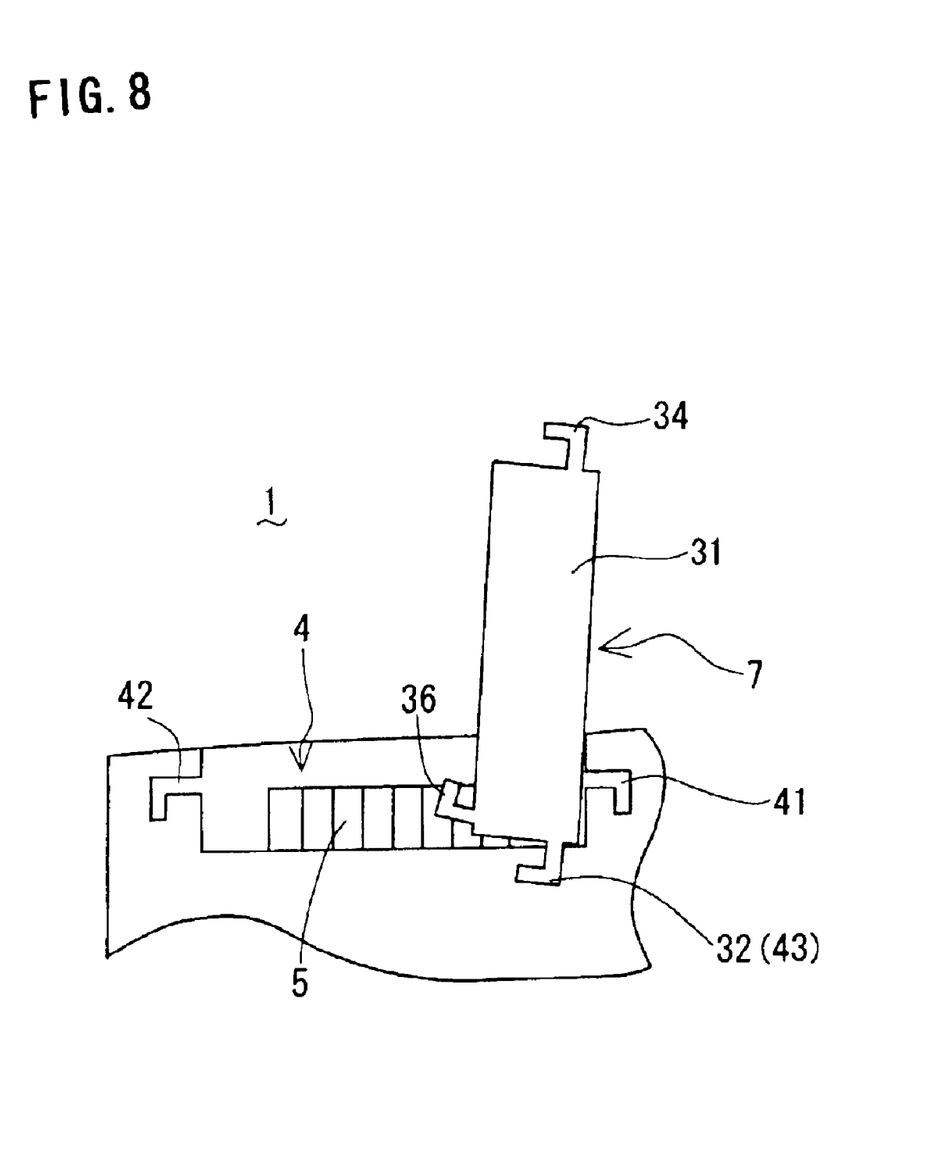
FIG. 8 is an upper view of a portion near the lens cover attached to the housing for blocking the hot air exhausted from the air outlet.

A projector 1 of the second embodiment will now be described referring to FIGS. 4 to 8. FIG. 4 is a perspective view of the lens cover 7 of the projector 1 of the second embodiment. FIG. 5 is an explanatory view of the way to attach the lens cover 7 to the housing 3 when no image is projected. FIG. 6 is an upper view of a portion near the lens cover 7 attached to the housing 3 to protect the projection lens 5. FIG. 7 is an explanatory view of the way to attach the lens cover 7 to the housing 3 when an image is projected. FIG. 8 is an upper view of a portion near the lens cover 7 located for blocking the hot air from an air outlet 8 when an image is projected. In the second embodiment, the lens cover 7 is detachable from the housing 3 of the main body 2. More specifically, the lens cover 7 is provided with fitting portions 32 to 35 for attaching the lens cover 7 to the housing 3, as shown in FIGS. 4 and 5. The housing 3 has a couple of guide rails 41 and 43 where the fitting portions 32 and 33 are fitted and a guide rail 41 where the fitting portions 34 and 35 are fitted. The guide rails 41 and 42 are assigned to hold the lens cover 7 at the location to cover the front side of the projection lens 5 when no image is projected. The guide rail 43 is assigned to hold the lens cover 7 at an angle for preventing the hot air exhausted from the air outlet 8 from running across the light path of the projected light from the projection lens 5 when an image is projected. The cross section of the guide rails 41 and 43 is substantially equal to that of the fitting portions 32, 33, and 36. The cross section of the guide rail 42 is substantially equal to that of the fitting portions 34 and 35.

When the projection of an image is not desired, the fitting portions 33 and 35 of the lens cover 7 are fitted into the corresponding guide rails 41 and 42 as denoted by the arrows F and I in FIG. 5. This allows the fitting portions 32 and 34 of the lens cover 7 to be guided into the corresponding guide rails 41 and 42 as denoted by the arrows G and J and hence the lens cover 7 to be shifted to a position for covering the front side of the projection lens 5. When the lens cover 7 is at its closing position, its fitting portions 32 and 34 stay at the uppermost end of the guide rails 41 and 42 respectively and its fitting portion 36 at the uppermost end of the guide rail 43 as shown in FIG. 6. Accordingly, the guide rails 41 to 43 remain not exposed at the uppermost end, hence contributing to the favorable appearance of the projector 1. Also, the guide rails 41 to 43 is protected from any dust or dirt. This fitting portion 36 is equivalent to a covering portion in claim 12.

When the projection of an image is desired, the fitting portion 33 of the lens cover 7 is fitted into the guide rail 43 as denoted by the arrow K in FIG. 7. This allows the fitting portion 32 of the lens cover 7 to be guided into the corresponding guide rail 43 as denoted by the arrow L and hence the lens cover 7 to be held at such an angle where the hot air exhausted from the air outlet 8 as shown in FIG. 8 is blocked. As the lens cover 7 like that of the first embodiment prevents the hot air exhausted from the air outlet 8 from running across the light path of the projected light from the projection lens 5, it can eliminate the generation of shimmers in the projected image with no use of a dedicated air guide for blocking the hot air thus ensuring a quality of the image. When the projection of an image is desired, the fitting portion 32 of the lens cover 7 covers the uppermost end of the guide rail 43 as shown in FIG. 8. The guide rails 41 and 42 represent guide rails of a first type in claim 11 while the guide rail 43 represents a guide rail of a second type in claim 11.

Figure 9:
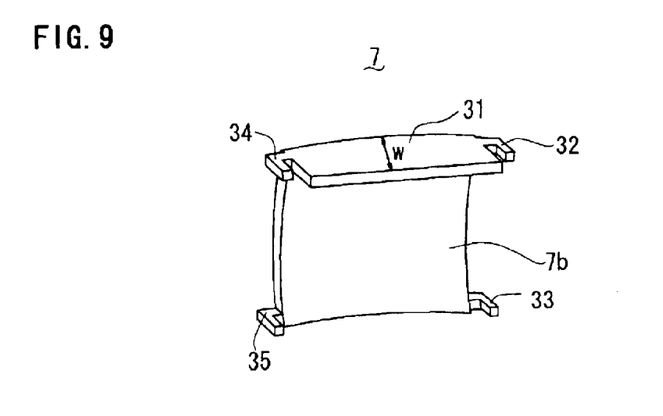
FIG. 9 is a perspective view of a lens cover in projector showing a third embodiment of the present invention.
Figure 10:
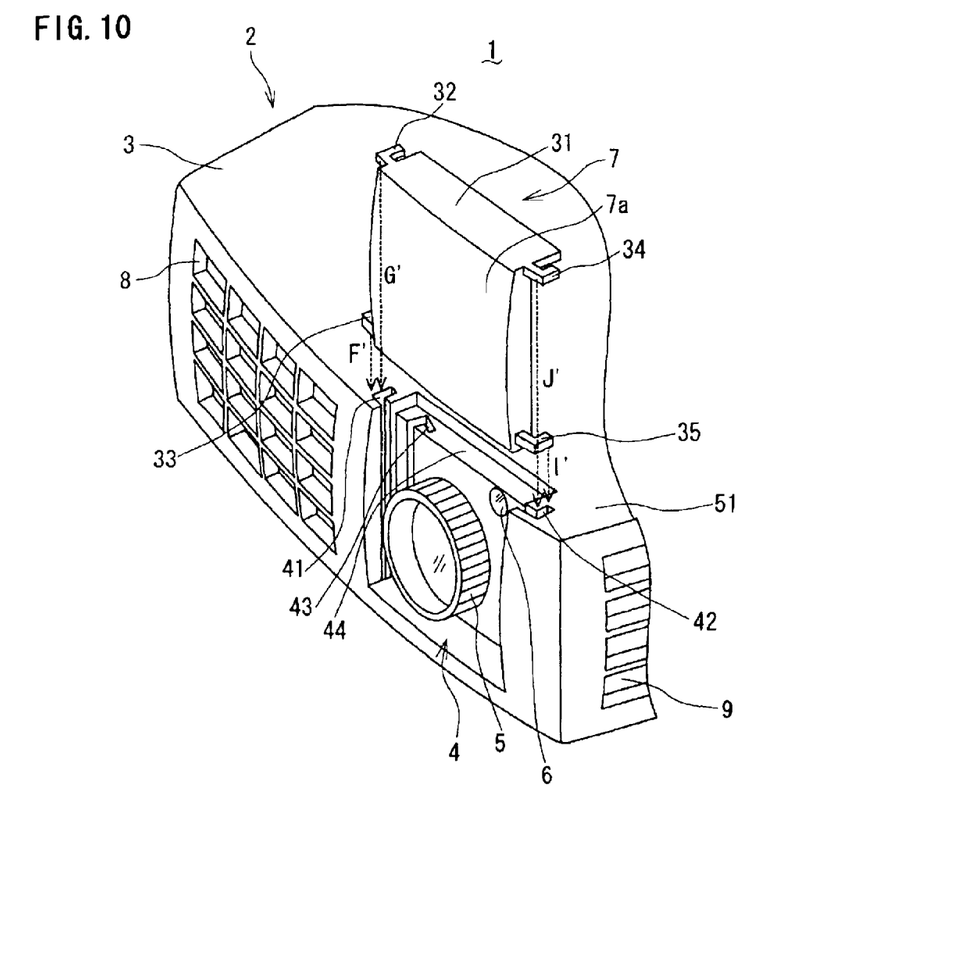
FIG. 10 is an explanatory view of the way to attach the lens cover to the housing of the projector when the projection of an image is not desired.
Figure 11:
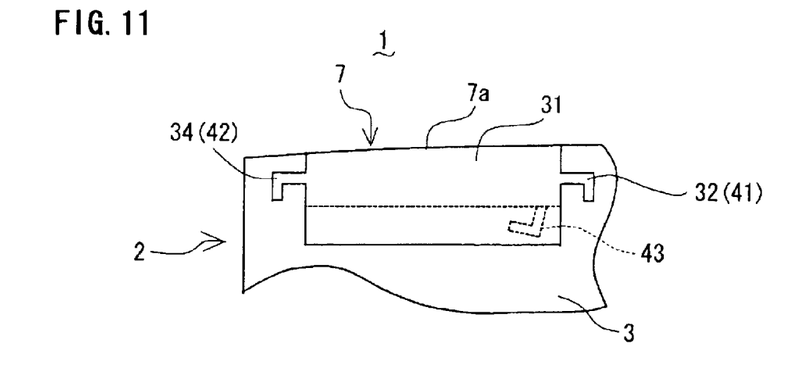
FIG. 11 is an upper view of a portion near the lens cover attached to the housing and covering the projection lens in the projector.
Figure 12:
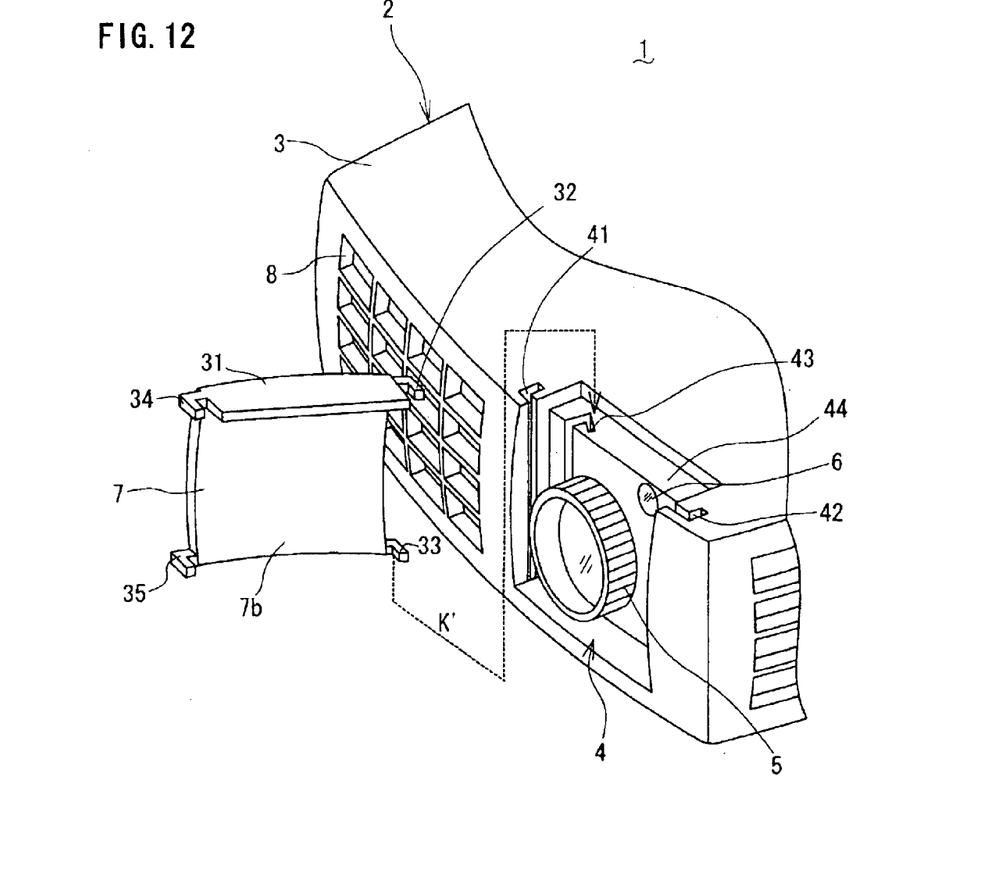
FIG. 12 is an explanatory view of the way to attach the lens cover to the housing in the projector when the projection of an image is desired.

A projector 1 of the third embodiment will be described referring to FIGS. 9 to 12. FIG. 9 is a perspective view of the lens cover 7 in the projector 1 of the third embodiment. FIG. 10 is an explanatory view of the way to attach the lens cover 7 to a housing 3 when the projection of an image is not desired. FIG. 11 is an upper view of a portion near the lens cover 7 attached to the housing 3 and covering the projection lens 5 when the projection of an image is not desired. FIG. 12 is an explanatory view of the way to attach the lens cover 7 to the housing 3 when the projection of an image is desired. As the projector 1 of the third embodiment has almost the same arrangement as the projector 1 of the second embodiment has, similar components to those of the projector 1 of the second embodiment are denoted by the same numerals that denote the components of the projector 1 of the second embodiment throughout FIGS. 11 to 14. The uppermost end of the guide rail 43 is covered with the fitting portion 36 when the projection of an image is not desired in the second embodiment. In the third embodiment, a top plate 31 (which represents a covering portion in claim 12) is used for closing the uppermost end of the guide rail 43. As shown in FIG. 9, the width W on the top plate 31 of the lens cover 7 in the projector 1 of the third embodiment is more than that of the lens cover 7 of the projector 1 of the second embodiment. Also as shown in FIG. 10, the surface 44 including the uppermost end of the guide rail 43 of the housing 3 is lower in the height than the upper surface 51 of the housing 3.

When the projection of an image is desired, the fitting portions 33 and 35 of the lens cover 7 are inserted by the user into the corresponding guide rails 41 and 42 respectively as denoted by the arrows F' and I' in FIG. 10. This allows the fitting portions 32 and 34 of the lens cover 7 to be guided into the corresponding guide rails 41 and 42 as denoted by the arrows G' and J' and thus the lens cover 7 to be shifted to a position for covering the front side of the projection lens 5. When the lens cover 7 is at its closing position, its fitting portions 32 and 34 cover the uppermost end of the guide rails 41 and 42 respectively and its top plate 31 covers the guide rail 43, as shown in FIG. 11. Accordingly, the guide rails 41 to 43 remain not exposed at the uppermost end, hence contributing to the favorable appearance of the projector 1. Also, the guide rails 41 to 43 is protected from any dust or dirt.

When the projection of an image is desired, the fitting portion 33 of the lens cover 7 is fitted into the guide rail 43 as denoted by the arrow K' in FIG. 12. This allows the fitting portion 32 of the lens cover 7 to be guided into the corresponding guide rail 43 like in the second embodiment and hence the lens cover 7 to be held at such an angle that blocks the hot air exhausted from the air outlet 8. As the result, the lens cover 7 prevents the hot air exhausted from the air outlet 8 from running across the light path of the projected light from the projection lens 5.

The present invention is not limited to the foregoing embodiments but may be embodied with various modifications. For example, the projector is not limited by the projector 1 in each of the embodiments having the projection lens 5 and the air outlet 8 provided side by side in the front side of the housing 3 but may be modified with the projection lens and the air outlet arranged in a vertical row in the front side of the housing. Alternatively, the present invention may be implemented in the form of another projector having the projector lens and the air outlet provided in different sides of the housing while is not shown. Moreover, the fitting portions for attaching the lens cover to the housing in the second and third embodiments may be replaced by rib-shaped fitting portions.

This application holds a priority right in view of the utility model application dated on Sep. 19, 2002. The entire teachings of the utility model application are cited as the reference in this application.

What is claimed is:

1. A projector, comprising:
   a light source;
   a projection lens for projecting an optical image using a light emitted by the light source;
   a housing for containing the light source and the projection lens;
   an air outlet for exhausting hot air which was used for cooling the light source to the outside; and
   a lens cover for protecting the projection lens; wherein the housing is adapted to maintain the lens cover between the air outlet and the projection lens.

2. The projector according to claim 1, wherein the lens cover is adapted to be held by the housing at such a angle where the hot air exhausted from the air outlet is prevented from running across a light path of the optical image projected by the projection lens.

3. The projector according to claim 1, wherein the projection lens is located adjacent to the air outlet.

4. The projector according to claim 1, wherein the projection lens is located at a same side where the air outlet is located.

5. The projector according to claim 4, wherein the projection lens and the air outlet are located at a front side of the housing.

6. The projector according to claim 1, further comprising an exhaust fan for cooling the light source.

7. The projector according to claim 6, wherein the hot air which was used for cooling the light source is exhausted from the air outlet to the outside of the housing.

8. The projector according to claim 1, wherein the lens cover is arranged so as to pivot relative to the housing of the projector.

9. The projector according to claim 8, wherein the lens cover is arranged vertically relative to an optical axis of the projection lens for pivoting movement on an axis located between the projection lens and the air outlet.

10. The projector according to claim 1, wherein the lens cover is detachable from the housing of the projector.

11. A projector, comprising:

a projection lens for projecting an optical image using a light emitted by a light source;

an air outlet for exhausting hot air which was used for cooling the light source to the outside; and a lens cover for protecting the projection lens;

wherein the lens cover has fitting portions to attach the lens cover to a housing;

the housing has a guide rail of a first type and a guide rail of second type arranged for allowing the fitting portions to be inserted thereto;

the guide rail of the first type guides the lens cover to a position for covering the front side of the projection lens when the fitting portion is inserted into the guide rail of the first type, and the guide rail of the second type guides the lens cover to such a position where the hot air exhausted from the air outlet is prevented from running across the light path of a projected light from the projection lens when the fitting portion is inserted into the guide rail of the second type.

12. The projector according to claim 11, wherein the lens cover has a covering portion arranged for covering the uppermost end of the guide rail of the second type when the fitting portion is inserted into the guide rail of the first type.

13. A projector, comprising:

a housing;

a light source arranged in the housing;

a projection lens mounted in the housing for projecting an optical image using light emitted by the light source;

an air outlet exhausting to an exterior of the housing air used to cool the light source;

a lens cover for protecting the projection lens; and wherein the housing is adapted to maintain the lens cover in a position between the air outlet and the projection lens when the optical image is projected to deflect the air away from the optical image.

* * * * *